United States Patent
Barreto De Pinho

(10) Patent No.: US 12,103,700 B2
(45) Date of Patent: Oct. 1, 2024

(54) AIRCRAFT WITH A FUEL STORAGE SYSTEM

(71) Applicant: AIRBUS HELICOPTERS DEUTSCHLAND GMBH, Donauworth (DE)

(72) Inventor: Marcello Barreto De Pinho, Friedberg-Paar (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 17/229,187

(22) Filed: Apr. 13, 2021

(65) Prior Publication Data
US 2022/0063830 A1    Mar. 3, 2022

(30) Foreign Application Priority Data
Aug. 31, 2020   (EP) .................................... 20400016

(51) Int. Cl.
*B64D 37/32*    (2006.01)
*B64C 27/04*    (2006.01)
(Continued)

(52) U.S. Cl.
CPC .............. *B64D 37/32* (2013.01); *B64C 27/04* (2013.01); *B64D 37/005* (2013.01); *B64D 37/04* (2013.01)

(58) Field of Classification Search
CPC ...... B64D 37/10; B64D 37/04; B64D 37/005; B64D 37/32; F16K 24/00; B60K 15/035; B60K 2015/03523; B60K 2015/03528
See application file for complete search history.

(56) References Cited

U.S. PATENT DOCUMENTS

| | | | | |
|---|---|---|---|---|
| 3,432,121 A | * | 3/1969 | Delaney | B64D 39/04 244/17.11 |
| 4,457,443 A | | 7/1984 | Casimir et al. | |

(Continued)

FOREIGN PATENT DOCUMENTS

| | | |
|---|---|---|
| CN | 104527987 B | 6/2016 |
| CN | 207773499 U | 8/2018 |

(Continued)

OTHER PUBLICATIONS

"Concorde Vapor Seal & Fuel Tank Ventilation." Heritage Concorde, archived on Aug. 8, 2020 at Internet Archives, web.archive.org/web/20200807122130/https://www.heritageconcorde.com/vapor-sealfuel-tank-interspaces-ventil (Year: 2020).*

(Continued)

*Primary Examiner* — Joshua J Michener
*Assistant Examiner* — Ka Chun Leung
(74) *Attorney, Agent, or Firm* — Brooks Kushman P.C.

(57) ABSTRACT

An aircraft with a fuselage that accommodates a floor panel and a fuel storage system, wherein the fuel storage system comprises a tank system with at least one main tank 5a that is arranged underneath the floor panel; a cross ventilation system with a plurality of ventilation lines for venting the tank system, wherein the plurality of ventilation lines comprises at least one crossing ventilation line 11a that is routed from a first lateral side of the tank system to an opposite second lateral side of the tank system; and wherein the at least one crossing ventilation line is routed underneath or in the floor panel from the first lateral side of the tank system to the second lateral side of the tank system.

12 Claims, 9 Drawing Sheets

(51) Int. Cl.
 B64D 37/00 (2006.01)
 B64D 37/04 (2006.01)

(56) References Cited

U.S. PATENT DOCUMENTS

| | | | |
|---|---|---|---|
| 6,439,506 | B1 | 8/2002 | Schlegel et al. |
| 9,162,772 | B2 | 10/2015 | Basset |
| 2001/0035168 | A1 | 11/2001 | Meyer et al. |
| 2005/0241700 | A1* | 11/2005 | Cozens ............... B64D 37/32 137/587 |
| 2006/0214061 | A1 | 9/2006 | Howe |
| 2008/0173762 | A1 | 7/2008 | Crowley |
| 2009/0050743 | A1* | 2/2009 | Barbosa ............... B64D 37/08 244/135 R |
| 2009/0321577 | A1* | 12/2009 | Vinicius ............... B64D 37/005 244/135 R |
| 2012/0111417 | A1 | 5/2012 | Smith et al. |
| 2015/0122939 | A1* | 5/2015 | Bistuer ............... B64D 37/04 244/17.11 |
| 2019/0389592 | A1* | 12/2019 | Huebner ............... B64D 37/06 |

FOREIGN PATENT DOCUMENTS

| | | | |
|---|---|---|---|
| DE | 1506114 | A1 | 6/1969 |
| DE | 19540267 | A1 | 4/1997 |
| EP | 1132246 | A2 | 9/2001 |
| EP | 1084952 | B1 | 10/2003 |
| EP | 1132246 | A3 | 8/2005 |
| EP | 2572919 | A1 | 3/2013 |
| FR | 2756255 | B1 | 5/1998 |
| GB | 1153040 | * | 5/1969 ............ B64D 37/00 |

OTHER PUBLICATIONS

"Split Flapper Fuel Valve." Essex Industries, archived on Jan. 13, 2019 at Internet Archives, web.archive.org/web/20200812114327/https://essexindustries.com/products/split-flapper-fuel-valve/ (Year: 2019).*
"Operator's Manual—Army Model UH-1H/V Helicopters." Department of the Army. Feb. 15, 1988. (Year: 1988).*
Cook et al. "Evaluation of the UH1-D/H Helicopter Crashworthy Fuel System in a Crash Environment." USAAMRDL Technical Report 71-47. Nov. 1971. (Year: 1971).*
"Helicopter Review: Bell UH-1 Iroquois "Huey" by Nimbus Simulations." X-Plane Reviews, Sep. 5, 2019, xplanereviews.com/index.php?/forums/topic/1505-helicopter-review-bell-uh-1-iroquois-huey-by-nimbus-simulations/ (Year: 2019).*
European Search Report for European Application No. EP 20400016.0, Completed by the European Patent Office, Dated Jan. 29, 2021, 12 pages.
Keith Conrad: "Aircraft Accident Report Mar. 2015", Oct. 23, 2015 XP055770274.
First Office Action for Chinese Application No. 202110425817.3, dated Jan. 10, 2024, 20 Pages.
Office Action for Korean Application No. 10-2023-0032039, dated Nov. 23, 2023, 7 Pages.
Second Office Action for Chinese Application No. 202110425817.3, dated Mar. 29, 2024, 20 Pages.

* cited by examiner

AIRCRAFT WITH A FUEL STORAGE SYSTEM

CROSS-REFERENCE TO RELATED APPLICATIONS

This application claims priority to European patent application No. EP 20400016.0 filed on Aug. 31, 2020, the disclosure of which is incorporated in its entirety by reference herein.

BACKGROUND OF THE INVENTION

(1) Field of the Invention

The present embodiments are related to an aircraft with a fuselage that accommodates a floor panel and a fuel storage system, wherein the fuel storage system comprises a tank system with at least one main tank that is arranged underneath the floor panel, and a cross ventilation system with a plurality of ventilation lines for venting the tank system, wherein the plurality of ventilation lines comprises at least one crossing ventilation line that is routed from a first lateral side of the tank system to an opposite second lateral side of the tank system.

(2) Description of Related Art

In an aircraft having a fuel storage system with a tank system that includes at least one main tank having a predetermined tank volume, generally a ventilation system with a plurality of ventilation lines for venting the tank system is required. The ventilation system is usually located above the at least one main tank to enable a suitable ventilation function such that the at least one main tank can "breathe".

More specifically, the ventilation system is required in order to relieve both pressure and vacuum from the at least one main tank. In particular, the ventilation system equalizes the internal tank pressure inside of the at least one main tank with the surrounding atmospheric pressure, thus, avoiding tank collapsing due to negative pressure. This is particularly necessary as the air pressure is altered by atmospheric changes when the aircraft climbs or descends during flight operation.

Different ventilation systems are known from the prior art. By way of example, such ventilation systems are described in the documents EP 1 084 952 B1, FR 2 756 255 B1, U.S. Pat. No. 9,162,772 B2, and CN 104 527 987 B.

Conventional ventilation systems may include an associated expansion tank. If the ventilation system of a given aircraft includes an expansion tank, a gravity fuel port of the given aircraft must be positioned underneath the bottom of the expansion tank in order to guarantee, mechanically, that the expansion tank will not be filled during a normal gravity fueling process via the gravity fuel port. In this case, before the expansion tank starts to get filled during the normal gravity fueling process, the fuel will come out of the gravity fuel port according to the communicating vessels principle. Thus, an associated tank volume of the expansion tank will be reserved only for fuel volume expansion.

Usually, it is also considered that the ground has not a perfect zero position. There are always small pitch and roll angles when an aircraft is being tanked due to terrain irregularities. Furthermore, there is usually also already an angle between a cabin floor and a landing gear of a given aircraft that is provided to compensate any pitch angle tendency to the front of the given aircraft, when the latter is being tanked.

More specifically, if the given aircraft is e.g. a helicopter, then it can be considered that the helicopter generally has a nose up attitude upon being tanked. Therefore, the fuel will be charged from a supply tank arranged in a rear section of the helicopter to the main tank arranged in a front section of the helicopter. The highest point of both tanks during the gravity fueling process will, thus, be at the front and at the top of the main tank.

Moreover, a respective roll angle tendency due to terrain irregularities has also to be taken into consideration, as it may generate a comparatively high deviation between the bottom of a given expansion tank and the gravity fuel port. In order to guarantee that the tank volume of the expansion tank will not be filled during the normal gravity fueling process, the high of the gravity fuel port has to be even lower than the bottom of the expansion tank to compensate this comparatively high deviation.

However, if a crash and an ensuing rollover of a given aircraft occurs, the at least one main tank can be reversed and attain a position over or beside the ventilation system. In this case, fuel inside of the at least one main tank fills all free spaces available in the ventilation system. In other words, the predetermined tank volume will be moved to the ventilation system.

Nevertheless, the ventilation system generally consists essentially of tubes with small diameters and may include an expansion tank that connects the at least one main tank to an exterior outlet, wherein the expansion tank is usually only suitable to receive approximately 2% of the predetermined tank volume of the at least one main tank. Thus, the ventilation system with the expansion tank may not have enough volume available in order to retain the predetermined tank volume of the at least one main tank. In this case, the fuel that migrates from the at least one main tank to and through the ventilation lines may come out of respectively associated ventilation line outlets, if there is no feature to avoid it. Hence, without such a feature a fuel leakage may occur during and after the rollover of the aircraft such that the risk of fire after crash increases significantly.

In order to avoid fuel leakage through the ventilation system of a given aircraft in case of rollover, flap valves may be provided at the top and to both sides of the at least one main tank of the given aircraft, e.g. at respective ventilation points of the at least one main tank where the latter is connected to the ventilation system. Each flap valve has an associated flap that falls down due to gravity, thus, closing the ventilation system in rollover situation. A respective flap valve system is e.g. described in the document EP 2 572 919 A1.

However, in real-life rollover situations such a flap valve may operate imprecisely and allow some fuel leakage at least in intermediate rollover positions, in which the flap of the flap valve may not close an associated valve seat completely. Therefore, the use of flap valves cannot be considered as a failure free fuel leakage prevention solution and may not be appropriate to prevent entirely fuel leakage, which is mandatory to avoid possibly hazardous and critical events in rollover situations of the given aircraft.

A failure free solution consists in the application of a cross ventilation system that makes use of the communicating vessels principle. The functional principle of such a cross ventilation system is to route a suitable ventilation line from a left-hand ventilation side of the at least one main tank of a given aircraft through the aircraft's upper shell to a lowest possible outlet position at a right-hand side of the aircraft, and vice versa. Accordingly, at least two ventilation lines are provided which cross each other in the aircraft's upper shell, thus, necessitating comparatively long ventilation lines. In case of using double ventilation lines to avoid fuel leakages inside of a cabin of the given aircraft, then there is even twice the length of the ventilation lines involved and, thus, much more weight generated.

In case of a rollover of a given aircraft having a conventional cross ventilation system, if the given aircraft is tilted onto one of its length sides such that the at least one main tank is simultaneously turned so that a part of the cross ventilation system is below the main tank while another part is above the main tank, a respective tank volume inside of the main tank will only fill a respective lower side of the cross ventilation system until it reaches in the lower side of the cross ventilation system the filling level of the relocated main tank. More specifically, the fuel will be guided along a crossing ventilation line from the lower side of the cross ventilation system toward an upper side of the cross ventilation system on an upper side of the turned main tank. The upper side has a higher level than the main tank, thus, avoiding possible fuel leakages.

In other words, if the given aircraft is tilted either to its left or right side, the fuel will stay contained in the cross ventilation system, as the fuel from the left side will be rerouted to the right side and vice versa. In this situation a respective ventilation line outlet of the opposite side will be always higher than the highest position of the at least one main tank and, therefore, the fuel cannot come out of one of the ventilation line outlets of the cross ventilation system according to the communicating vessels principle.

However, in upside-down position of the given aircraft the main tank is reversed and positioned above, respectively over, the cross ventilation system. In this case, the tank volume of the main tank will fill both sides of the cross ventilation system until the whole system reaches the same fuel level. More specifically, in the upside-down position of the given aircraft both sides of the cross ventilation system are filled with fuel from the main tank until the high of an associated lower ventilation line outlet.

If there is an offset between the bottom of the given aircraft and the lower ventilation line outlet, an associated offset volume cannot be contained by the cross ventilation system and, according to the communicating vessels principle, fuel would come out of the cross ventilation system. However, this offset volume is generally very small due to an underlying small height difference and it may, consequently, be neglected. Moreover, during taxiing before take-off, there is always a certain consume of fuel such that the offset volume would be reduced as a result of the consumption.

However, a major disadvantage of the conventional cross ventilation system is a respectively required length of the associated ventilation lines, due to the fact that the ventilation lines have to cross from one side of a given aircraft to the other side, passing by the upper shell and ending at a respective opposite lowest position.

BRIEF SUMMARY OF THE INVENTION

It is, therefore, an object of the present invention to provide a new aircraft with an improved cross ventilation system. This object is solved by an aircraft having the features of claim 1.

More specifically, according to the present invention an aircraft comprises a fuselage that accommodates a floor panel and a fuel storage system. The fuel storage system comprises a tank system with at least one main tank that is arranged underneath the floor panel, and a cross ventilation system with a plurality of ventilation lines for venting the tank system. The plurality of ventilation lines comprises at least one crossing ventilation line that is routed from a first lateral side of the tank system to an opposite second lateral side of the tank system. The at least one crossing ventilation line is routed underneath or in the floor panel from the first lateral side of the tank system to the second lateral side of the tank system.

Advantageously, the new cross ventilation system of the aircraft according to the present invention comprises ventilation lines which cross each other within a predetermined height, respectively thickness, reserved for the floor panel or underneath it. Thus, the conventionally comparatively long path of ventilation lines which pass through both sides and an upper shell or roof of the aircraft can be avoided. Nevertheless, a failure free functioning can be guaranteed while avoiding the disadvantages described above.

More specifically, already for certification reasons, a cross ventilation system requires use of double wall hose lines for realization of the ventilation lines. However, by using the double wall hose lines, a required length of the ventilation lines is doubled. This likewise applies to a number of respectively required fitting connections. Accordingly, by reducing the required length of the ventilation lines as well as a respectively required number of fitting connections, weight and costs of the cross ventilation system may be reduced significantly. In other words, less components, less weight, less installation time and, consequently, less costs.

An additional improvement may be achieved by integrating space reserved for fuel volume expansion directly inside of the at least one main tank so that there is no need for an extra expansion tank. Nevertheless, when designing at least one main tank with the integrated space, care must be taken as fuel expands in volume when it warms up and shrinks in volume when it cools down. Accordingly, a respective fuel level in the at least one main tank will vary throughout the day, even when the aircraft is not flying.

The integrated space may be made available in the floor panel above the at least one main tank, in order to allow a possible main tank growth without losing much tank volume. The floor panel, which is preferably formed in sandwich construction, is particularly suitable for accommodation of the integrated space. Thus, the need for an extra space for a conventional expansion tank may additionally be eliminated.

However, it should be noted that there is preferably in any case expansion space reserved for fuel volume expansion. This expansion space may be provided in the form of an extra expansion tank or, as described above, as the integrated space located inside of the at least one main tank. Preferably, neither the extra expansion tank nor the integrated space may be filled with fuel by means of a normal gravity fueling process.

In a first exemplary realization, a combination of the improved cross ventilation system that crosses itself underneath or in the floor panel of the aircraft and the absence of an extra expansion tank enables to deploy the full potential of all proposed improvements. First of all, there will be not only a reduction, but almost an elimination of ventilation lines outside of the tank system, which may only be achieved when a required expansion tank volume is integrated inside of the at least one main tank. In this way, not only an underlying length of the ventilation lines can be reduced by arranging the ventilation lines in or underneath the floor panel, but also the extra expansion tank, which is usually a double wall tank, with all its metallic connections may be omitted. In particular, if fuel double hose lines are used for implementing the ventilation lines to avoid leakages inside of a respective aircraft cabin, then the economized length of required ventilation lines is doubled, less clamps and/or other fixation elements are required, and there is no need e.g. for aluminum tubes to protect the ventilation lines in the roof area of the aircraft, and so on. However, this first exemplary realization does not only necessitate less components, weight and installation time involved, but allows to make space available for other equipment and/or system installation in the aircraft. This is an important advantage, as the number of electronically controlled devices inside of aircrafts has significantly increased over the past years, thus, leading to a lack of space for installation of new devices.

In a second exemplary realization, the ventilation lines of the cross ventilation system also cross each other underneath or in the floor panel of the aircraft, thus, only requiring ventilation lines with a shorter overall length. However, an extra expansion tank is provided for fuel volume expansion. Thus, while the required overall length of the ventilation lines is reduced, the ventilation system as a whole will not be fully optimized, as the extra expansion tank will require installation space inside of the aircraft, as well as all components required for installation and connection of the extra expansion tank inside of the aircraft.

In a third exemplary realization, the ventilation lines of the cross ventilation system again cross each other underneath or in the floor panel of the aircraft, thus, only requiring ventilation lines with a shorter overall length. However, an extra expansion tank is again provided for fuel volume expansion. In addition, another expansion tank or a supplementary ventilation line may be provided to augment an available space for fuel volume expansion.

According to one aspect, the at least one crossing ventilation line of the cross ventilation system is routed underneath or in the floor panel from a first ventilation point provided at the first lateral side on the at least one main tank to a manifold connection arranged at the second lateral side.

Preferably, the plurality of ventilation lines comprises at least one further ventilation line that is routed underneath or in the floor panel from a second ventilation point provided at the second lateral side on the at least one main tank to the manifold connection.

Preferably, the plurality of ventilation lines comprises at least two outlet ventilation lines that are routed underneath or in the floor panel from the manifold connection arranged at the second lateral side to associated outlets arranged at the first lateral side.

According to one aspect, the at least one main tank of the tank system comprises a predetermined fuel volume expansion space. The predetermined fuel volume expansion space may have a height that is equal or greater than a predefined spacing between a bottom shell of the fuselage and associated outlets of the cross ventilation system.

According to one aspect, the tank system comprises a gravity fuel port tank connection for enabling gravity fueling of the at least one main tank, wherein the gravity fuel port tank connection is arranged in a manner such as to prevent an entire filling of the at least one main tank by means of gravity fueling.

Preferably, the gravity fuel port tank connection is provided with a one-way valve.

According to one aspect, the manifold connection is arranged above floor panel level.

According to one aspect, the tank system comprises an expansion tank that is arranged at the second lateral side, and the at least one crossing ventilation line is routed underneath or in the floor panel from a first ventilation point provided at the first lateral side on the at least one main tank to the expansion tank.

Preferably, the plurality of ventilation lines comprises at least one further ventilation line that is routed underneath or in the floor panel from a second ventilation point provided at the second lateral side on the at least one main tank to the expansion tank.

Preferably, the at least one crossing ventilation line is connected to the expansion tank at a first position that is further away from the floor panel than a second position where the at least one further ventilation line is connected to the expansion tank.

Preferably, the plurality of ventilation lines comprises at least two outlet ventilation lines that are routed underneath or in the floor panel from the expansion tank arranged at the second lateral side to associated outlets arranged at the first lateral side.

Preferably, the expansion tank of the tank system is arranged above floor panel level.

Preferably, the tank system comprises a gravity fuel port tank connection for enabling gravity fueling of the at least one main tank, wherein the gravity fuel port tank connection is arranged above floor panel level and below a lower expansion tank level.

According to one aspect, the aircraft is embodied as a helicopter.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
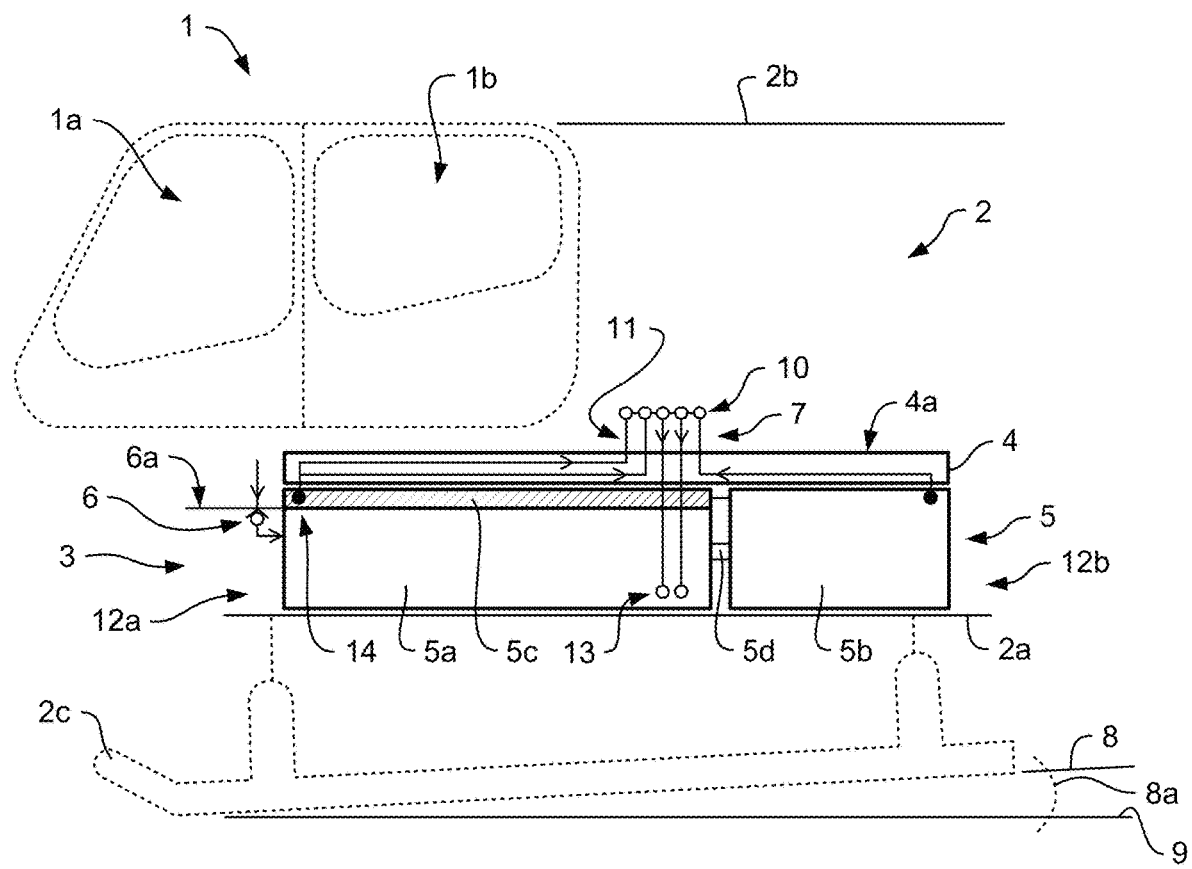
FIG. 1 shows a schematic view of an aircraft having a fuel storage system according to a first embodiment.

FIG. 1 shows an aircraft 1 that is exemplarily illustrated as a rotary wing aircraft and, more particularly, as a helicopter. Thus, for purposes of simplicity and clarity, the aircraft 1 is hereinafter referred to as the "helicopter 1".

It should be noted that the helicopter 1 is only shown schematically and that only components of the helicopter 1 which are required to explain the present invention are illustrated and described in detail. All other components of the helicopter 1, which are well-known to the person skilled in the art, were omitted for simplicity and clarity of the drawings, and for brevity and conciseness of the description.

Illustratively, the helicopter 1 comprises a fuselage 2 that forms an aircraft interior region 1a, 1b. The aircraft interior region 1a, 1b preferably accommodates at least a cockpit 1a and may further accommodate a cabin 1b for passengers and/or cargo.

The fuselage 2 is illustratively provided with a bottom shell 2a and an upper shell 2b. By way of example, the upper shell 2b forms a roof of the helicopter 1 and the bottom shell 2a is connected to a landing gear 2c which is exemplarily embodied as a skid-type landing gear.

Illustratively, the helicopter 1 is shown in a parking position with the landing gear 2c contacting ground 8. For purposes of illustration, the ground 8 is slightly inclined, i.e. arranged at a predefined angle 8a relative to a flat horizontal reference plane 9, for illustrating a general nose up attitude of the helicopter 1 during fueling.

According to one aspect, the fuselage 2 accommodates a fuel storage system 3 and a floor panel 4. The floor panel 4 illustratively defines a floor panel level 4a.

The fuel storage system 3 preferably includes at least a tank system 5 and a ventilation system 7. The ventilation system 7 is preferably embodied as a cross ventilation system.

Preferably, the tank system 5 has at least one main tank 5a that is arranged underneath the floor panel 4. The tank system 5 may further include a supply tank 5b that is connected to the at least one main tank 5a via one or more associated tank connections 5d. The supply tank 5b and the tank connections 5d may also be arranged underneath the floor panel 4. It should be noted that the floor panel 4 is, however, only illustrated in the region of the tank system 5, for simplicity and clarity of the drawings.

By way of example, the at least one main tank 5a is arranged at a forward side 12a of the tank system 5, which is illustratively near the cabin 1a, and the supply tank 5b is arranged at a rearward side 12b of the tank system 5. The forward side 12a and the rearward side 12b are defined with respect to a forward flight direction of the helicopter 1.

Fueling of the tank system 5 may be performed via an associated gravity fuel port tank connection 6. In a first exemplary realization, the gravity fuel port tank connection 6 is preferably configured such that fueling of the tank system 5 may only be performed up to a predetermined maximum gravity fueling level 6a of the at least one main tank 5a. By locating the predetermined maximum gravity fueling level 6a below a maximum fueling level of the at least one main tank 5a, which is illustratively determined by a height of the at least one main tank 5a, provision of a predetermined fuel volume expansion space 5c in the at least one main tank 5a may be enabled.

The tank system 5 and, more particularly, at least the at least one main tank 5a, is preferably vented by means of the cross ventilation system 7. For this purpose, the cross ventilation system 7 includes a plurality of ventilation lines 11 which may be implemented by suitable hose lines. The plurality of ventilation lines 11 is connected to the at least one main tank 5a, and illustratively also to the supply tank 5b, at associated ventilation points 14. The plurality of ventilation lines 11 is preferably interconnected via a suitable manifold connection 10 and connected to associated ventilation line outlets 13 via the manifold connection 10.

The manifold connection 10 is preferentially arranged above the floor panel level 4a. Thus, the ventilation points 14 will always be ventilated, independent of any roll and/or pitch angle deviation of the helicopter 1 due to terrain irregularities.

Figure 2:
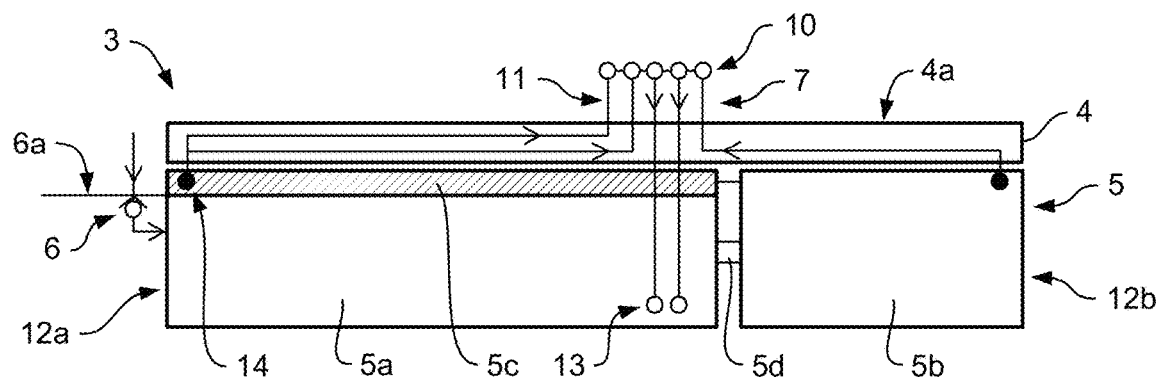
FIG. 2 shows a schematic side view of the fuel storage system of FIG. 1.

FIG. 2 shows the fuel storage system 3 and the floor panel 4 of FIG. 1. The fuel storage system 3 includes at least the tank system 5 and the ventilation system 7 of FIG. 1. As described above, the tank system 5 includes the at least one main tank 5a and the supply tank 5b, and the ventilation system 7 is preferentially embodied as a cross ventilation system with the plurality of ventilation lines 11, the manifold connection 10 and the ventilation line outlets 13. The at least one main tank 5a and, more generally, the tank system 5 is arranged underneath the floor panel 4.

Preferably, the ventilation lines 11 are at least essentially arranged and/or routed underneath or in the floor panel 4, i.e. underneath the floor panel level 4a. The floor panel 4 is preferentially formed in sandwich construction. Thus, the floor panel 4 may be embodied to enable routing of the ventilation lines 11 in the floor panel 4.

Figure 3:
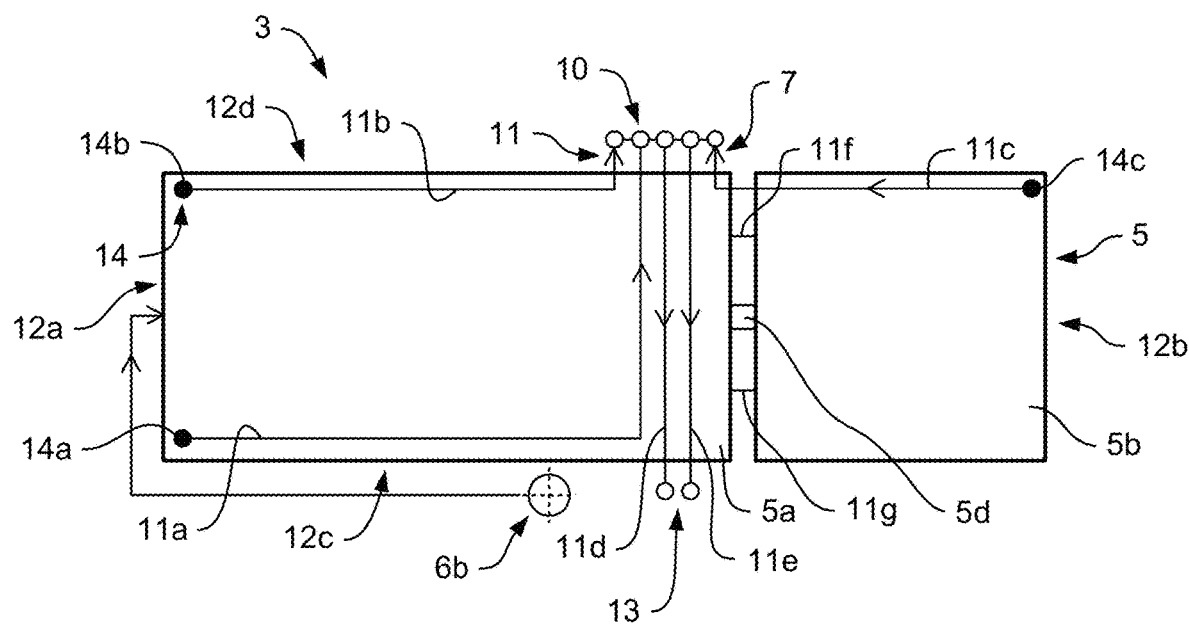
FIG. 3 shows a schematic top view of the fuel storage system of FIG. 1 and FIG. 2.

FIG. 3 shows the fuel storage system 3 with the tank system 5 and the ventilation system 7 of FIG. 1 and FIG. 2. As described above, the tank system 5 includes the at least one main tank 5a and the supply tank 5b, and the ventilation system 7 is preferentially embodied as a cross ventilation system with the plurality of ventilation lines 11, the manifold connection 10 and the ventilation line outlets 13. By way of example, the plurality of ventilation lines 11 includes ventilation lines 11f, 11g which interconnect the main tank 5a and the supply tank 5b.

Furthermore, the gravity fuel port tank connection 6 of FIG. 1 and FIG. 2 is shown. According to one aspect, the gravity fuel port tank connection 6 comprises an associated gravity fuel port 6b.

As described above, the gravity fuel port tank connection 6 is provided for enabling gravity fueling of the main tank 5a and is arranged in a manner such as to prevent an entire filling of the main tank 5a by means of gravity fueling. Therefore, the gravity fuel port tank connection 6 preferably comprises a suitable one-way valve, which may e.g. be located at the forward side 12a of the main tank 5a, preferentially at least approximately in the middle of the forward side 12a, as illustrated.

More specifically, as described above at FIG. 1, the helicopter 1 usually has a nose up attitude during fueling. Therefore, fuel introduced into the tank system 5 will fill the tank system 5 by flowing due to gravity from the rearward side 12b, i.e. the supply tank 5b, to the forward side 12a, i.e. the main tank 5a. The highest point of the tank system 5 during fueling will, thus, be at the forward side 12a and at the top of the main tank 5a.

Figure 4:
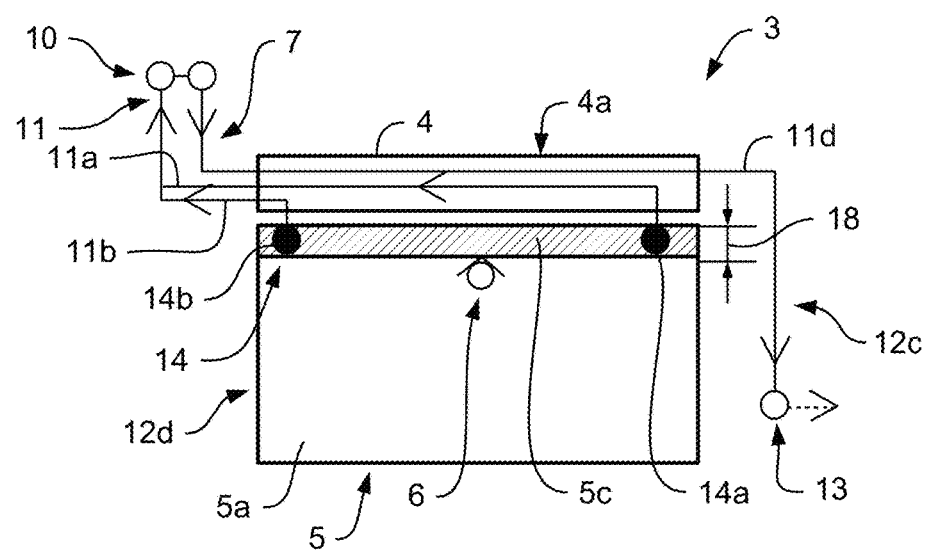
FIG. 4 shows a schematic front view of the fuel storage system of FIG. 1 to FIG. 3.

However, as described above at FIG. 1, and as further illustrated in FIG. 4, the one-way valve must be positioned to enable provision of the fuel volume expansion space 5c of FIG. 1 and FIG. 2 in the main tank 5a. In other words, a respective height installation of the one-way valve must be performed such that a minimum fuel expansion volume can be guaranteed and that also some terrain irregularities related to pitch angle direction of the helicopter 1 of FIG. 1 can be compensated. When the one-way valve is positioned in the middle of the main tank 5a, there will be no high deviation generated by roll angle tendency due to terrain irregularities anymore.

In contrast to FIG. 1 and FIG. 2, the fuel storage system 3 is now shown in top view, i.e. from above, and a first lateral side 12c of the tank system 5 as well as an opposite second lateral side 12d of the tank system 5 are, therefore, labelled in addition to the forward side 12a and the rearward side 12b. With respect to a forward flight direction of the helicopter 1 of FIG. 1, the first lateral side 12c illustratively corresponds to a left-hand side of the helicopter 1 and the second lateral side 12d corresponds to a right-hand side of the helicopter 1.

According to one aspect, the plurality of ventilation lines 11 comprises at least one crossing ventilation line 11a that is routed from the left-hand side 12c of the tank system 5 to the right-hand side 12d of the tank system 5. Illustratively, the crossing ventilation line 11a is routed from a ventilation point 14a of the ventilation points 14 of FIG. 1 and FIG. 2, which is provided at the main tank 5a, to the manifold connection 10, which is exemplarily arranged at or close to the right-hand side 12d of the tank system 5. The ventilation point 14a is preferably located at or close to the left-hand side 12c and, preferentially, at or close to the forward side 12a.

Furthermore, preferably at least one other ventilation line 11b of the ventilation lines 11 is routed along the right-hand side 12d of the tank system 5 to the manifold connection 10. Illustratively, the ventilation line 11b is routed from a ventilation point 14b of the ventilation points 14, which is provided at the main tank 5a, to the manifold connection 10. The ventilation point 14b is preferably located at or close to the right-hand side 12d and, preferentially, at or close to the forward side 12a.

Moreover, at least one other ventilation line 11c of the ventilation lines 11 may be routed along the right-hand side 12d of the tank system 5 to the manifold connection 10. The ventilation line 11c may be routed from a ventilation point 14c of the ventilation points 14, which is provided at the supply tank 5b, to the manifold connection 10. The ventilation point 14c is preferably located at or close to the right-hand side 12d and, preferentially, at or close to the rearward side 12b.

Preferably, at least one and, illustratively, two more crossing ventilation lines 11d, 11e are routed from the right-hand side 12d of the tank system 5 to the left-hand side 12c of the tank system 5. According to one aspect, the crossing ventilation lines 11d, 11e connect the manifold connection 10 to the ventilation line outlets 13.

It should be noted that provision of two ventilation line outlets 13 is mandatory for certification reasons. Therefore, the two more crossing ventilation lines 11d, 11e are provided.

FIG. 4 shows the fuel storage system 3 with the tank system 5 and the ventilation system 7 of FIG. 1 to FIG. 3, as well as the floor panel 4 that defines the floor panel level 4a of FIG. 1 and FIG. 2. As described above, the tank system 5 includes the main tank 5a and the ventilation system 7 is preferentially embodied as a cross ventilation system with the plurality of ventilation lines 11, the manifold connection 10 and the ventilation line outlets 13.

FIG. 4 further illustrates routing of the at least one crossing ventilation line 11a of FIG. 3 underneath or in the floor panel 4 from the left-hand side 12c of the tank system 5 to the right-hand side 12d of the tank system 5, as well as routing of the crossing ventilation lines 11d, 11e of FIG. 3 underneath or in the floor panel 4 from the right-hand side 12d of the tank system 5 to the left-hand side 12c of the tank system 5. Moreover, routing of the crossing ventilation line 11a and the ventilation line 11b of FIG. 3 to the manifold connection 10 is further illustrated.

Likewise, positioning of the one-way valve of the gravity fuel port tank connection 6 of FIG. 3 at the forward side (12a in FIG. 3) of the tank system 5 and at least approximately in the middle between the left-hand side 12c and the right-hand side 12d of the tank system 5 is further illustrated. As described above, the one-way valve is positioned to enable provision of the fuel volume expansion space 5c of FIG. 1 and FIG. 2. Illustratively, this fuel volume expansion space 5c has a height 18 that preferably enables storage of an expansion fuel volume of at least 2% of a total fuel volume that may be stored in the tank system 5.

It should be noted that, compared to a conventional main tank, the main tank 5a of the tank system 5 may be provided with increased dimensions. More particularly, a possible tank growth of a conventional main tank without losing much tank volume is possible, when a respective thickness of the floor panel 4 is formed with a local thickness reduction. The competent authorities request a minimum expansion fuel volume of 2% of the total fuel volume in a helicopter. Considering by way of example an 800 liters total fuel volume, then an expansion volume of 16 liters would be necessary as expansion fuel volume. As a result, for a 1.6 meter×1.0 meter main tank, only a tank height of 10 mm would be needed for the expansion fuel volume without considering pitch angles deviation. A usually comparatively big main tank surface accordingly allows having a big expansion fuel volume with a small height.

Figure 5:
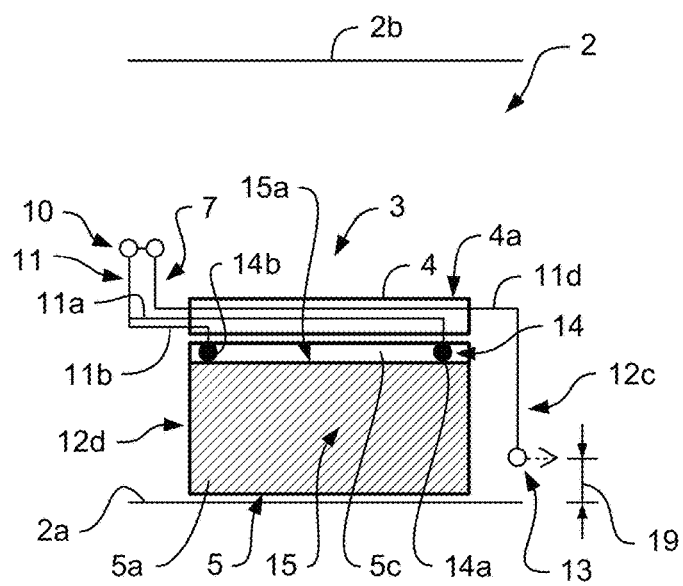
FIG. 5 shows the schematic front view of the fuel storage system of FIG. 4 in different positions during rollover.
Figure 5:
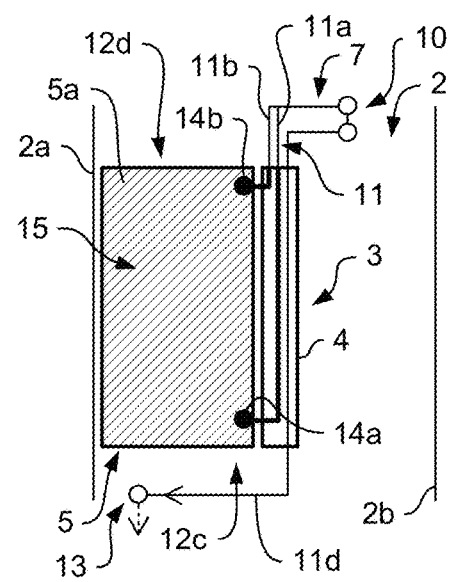
Figure 5:
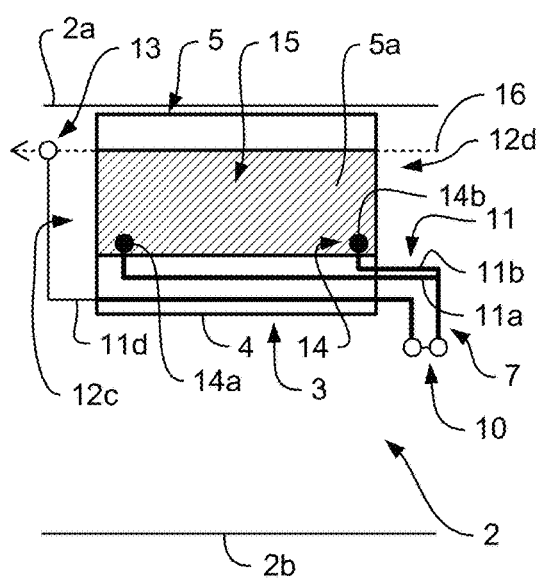
Figure 5:
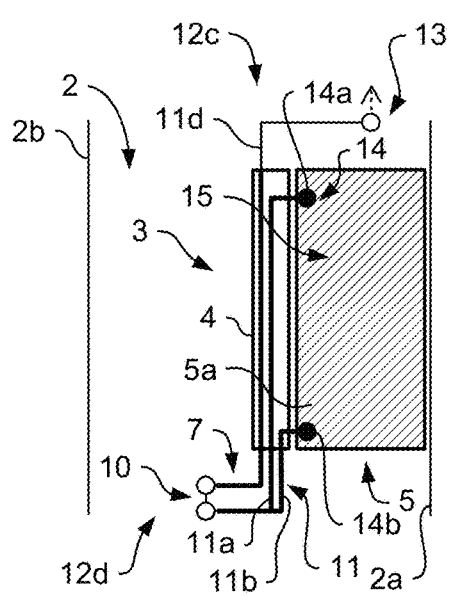

FIG. 5 shows the fuel storage system 3 with the tank system 5 and the ventilation system 7 of FIG. 4, as well as the floor panel 4 of FIG. 1 that defines the floor panel level 4a. As described above, the tank system 5 includes the main tank 5a with the fuel volume expansion space 5c, and the ventilation system 7 is preferentially embodied as a cross ventilation system with the plurality of ventilation lines 11, the manifold connection 10 and the ventilation line outlets 13. Furthermore, the bottom shell 2a and the upper shell 2b of the fuselage 2 of the helicopter 1 of FIG. 1 are shown to enable illustration of a spatial arrangement of the fuel storage system 3 relative to the fuselage 2 in four different, exemplified positions of the helicopter 1 during rollover. The four different positions are labelled from (A) to (D).

Position (A) corresponds to a normal head up position of the fuselage 2 with the upper shell 2b on top and the bottom shell 2a below. In this normal head up position, fuel 15 is in the main tank 5a and no fuel is in the ventilation system 7. More specifically, the fuel 15 illustratively fills the main tank 5a up to a fuel level 15a such that the fuel volume expansion space 5c and, consequently, the ventilation line outlets 13 are free of fuel, so that a fuel leakage may be prevented.

According to one aspect, a predefined spacing 19 is formed in the ventilation system 7 between the bottom shell 2a of the fuselage 2 and the ventilation line outlets 13. The predefined spacing 19 is preferably equal or smaller than the height 18 of FIG. 4 of the fuel volume expansion space 5c.

Position (B) corresponds to a first tilted position of the fuselage 2, wherein the fuselage 2 is exemplarily tilted by 90° from its normal head up position according to position (A) to the left side. Accordingly, the tank system 5 is illustratively lying on the left-hand side 12c.

In this first tilted position, the fuel 15 flows from the main tank 5a into the ventilation system 7 until an equilibrium is established between the main tank 5a and the ventilation system 7 according to the communicating vessels principle, as illustrated. In this equilibrium, the manifold connection 10 is free of fuel, as a highest point of the main tank 5a is lower than the manifold connection 10. Thus, the ventilation line outlets 13 likewise remain free of fuel, such that a fuel leakage may be prevented.

Position (C) corresponds to an upside-down position of the fuselage 2, with the bottom shell 2a on top and the upper shell 2b below. Accordingly, the tank system 5 is reversed and illustratively lying on its top side.

In this upside-down position, the fuel 15 flows from the main tank 5a into the ventilation system 7 until an equilibrium is established between the main tank 5a and the ventilation system 7 according to the communicating vessels principle. As illustrated, the equilibrium is reached when the ventilation system 7 is filled with fuel until the high of the ventilation line outlets 13. However, the ventilation line outlets 13 remain preferably free of fuel as a result of the dimensioning of the fuel volume expansion space 5c, such that a fuel leakage may be prevented.

Position (D) corresponds to a second tilted position of the fuselage 2, wherein the fuselage 2 is exemplarily tilted by 90° from its normal head up position according to position (A) to the right side. Accordingly, the tank system 5 is illustratively lying on the right-hand side 12d.

In this second tilted position, the fuel 15 also flows from the main tank 5a into the ventilation system 7 until an equilibrium is established between the main tank 5a and the ventilation system 7 according to the communicating vessels principle, as illustrated. In this equilibrium, the ventilation line outlets 13 remain free of fuel, as a highest point of the main tank 5a is lower than the ventilation line outlets 13, such that a fuel leakage may be prevented.

Figure 6:
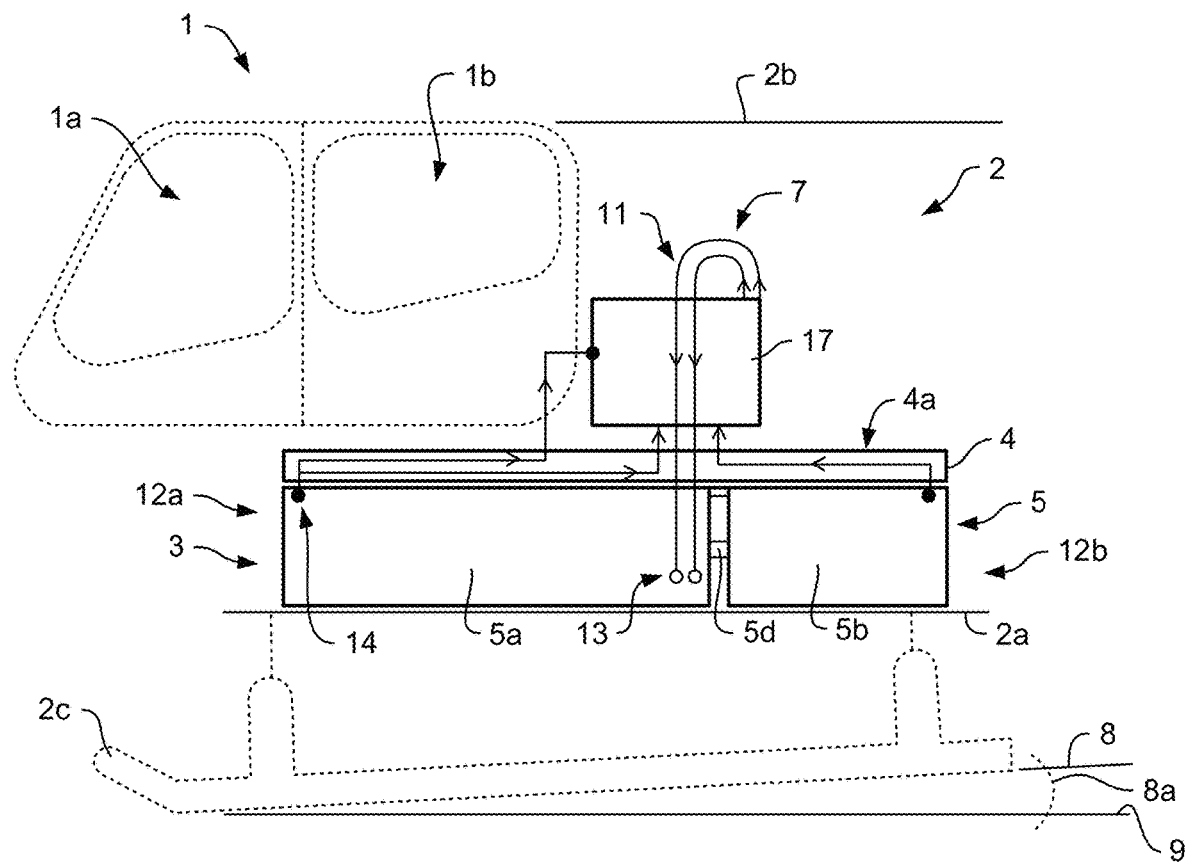
FIG. 6 shows a schematic view of an aircraft having a fuel storage system according to a second embodiment.

FIG. 6 shows the helicopter 1 of FIG. 1 with the fuselage 2 having the bottom shell 2a as well as the upper shell 2b, the floor panel 4 that forms the floor panel level 4a, and the fuel storage system 3 with the tank system 5 and the ventilation system 7. The tank system 5 includes the at least one main tank 5a and the supply tank 5b, and the ventilation system 7 is preferentially embodied as a cross ventilation system with the plurality of ventilation lines 11 and the ventilation line outlets 13.

However, in contrast to FIG. 1, the tank system 5 now further comprises according to an alternative realization an expansion tank 17 instead of the fuel volume expansion space 5c provided in the main tank 5a. Illustratively, the expansion tank 17 is arranged above the floor panel level 4a and takes over the functioning of and, thus, replaces the manifold connection 10 of FIG. 1 of the ventilation system 7. Accordingly, each one of the plurality of ventilation lines 11 is now connected to the expansion tank 17 in order to obtain an optimized length of the ventilation lines 11 without losing the property of avoiding leakage after rollover of the helicopter 1.

Figure 7:
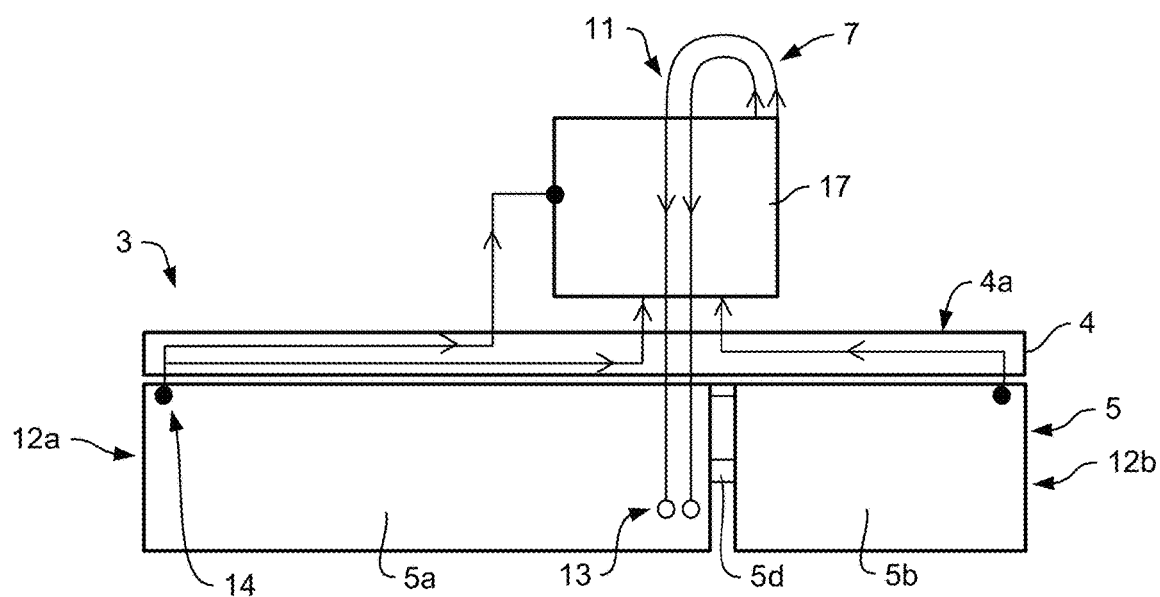
FIG. 7 shows a schematic side view of the fuel storage system of FIG. 6.

FIG. 7 shows the fuel storage system 3 and the floor panel 4 of FIG. 6, and is described in more detail in the light of FIG. 2. The fuel storage system 3 includes at least the tank system 5 and the ventilation system 7 of FIG. 1. The tank system 5 includes the at least one main tank 5a, the supply tank 5b, as well as the expansion tank 17, and the ventilation system 7 is preferentially embodied as a cross ventilation system with the plurality of ventilation lines 11 and the ventilation line outlets 13. The at least one main tank 5a and, more generally, the tank system 5 is arranged underneath the floor panel 4.

Preferably, the ventilation lines 11 are at least essentially arranged and/or routed underneath or in the floor panel 4, i.e. underneath the floor panel level 4a. The floor panel 4 is preferentially formed in sandwich construction. Thus, the floor panel 4 may be embodied to enable routing of the ventilation lines 11 in the floor panel 4.

Figure 8:
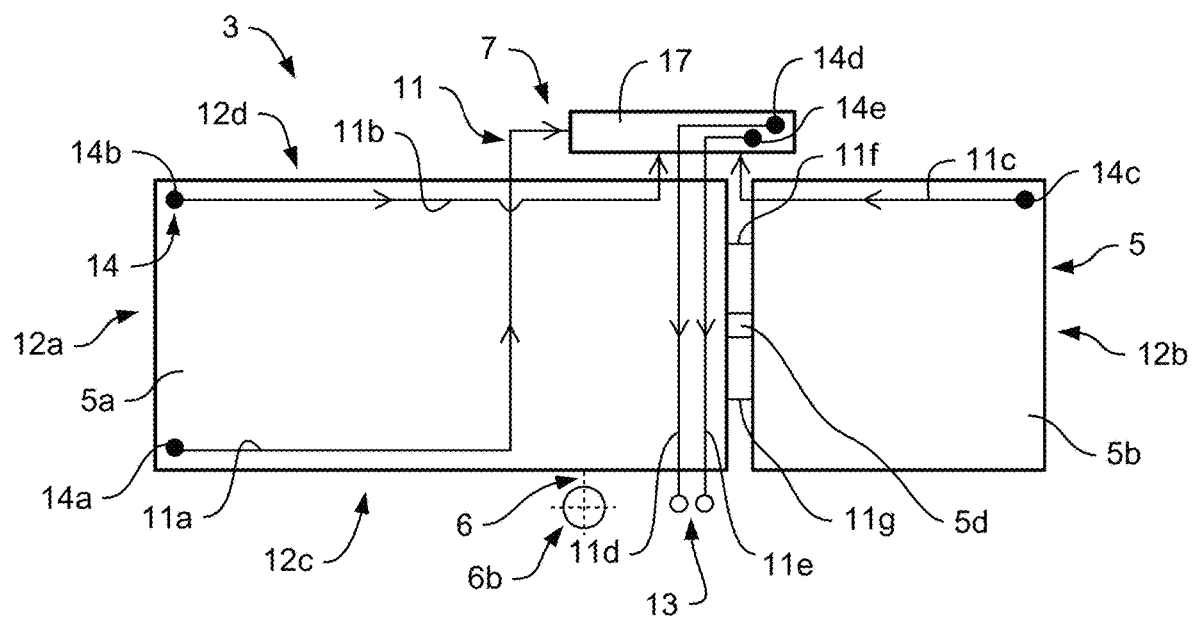
FIG. 8 shows a schematic top view of the fuel storage system of FIG. 6 and FIG. 7.

FIG. 8 shows the fuel storage system 3 with the tank system 5 and the ventilation system 7 of FIG. 6 and FIG. 7, and is described in more detail in the light of FIG. 3. The tank system 5 includes the at least one main tank 5a, the supply tank 5b, as well as the expansion tank 17, and the ventilation system 7 is preferentially embodied as a cross ventilation system with the plurality of ventilation lines 11 and the ventilation line outlets 13.

The plurality of ventilation lines 11 comprises the at least one crossing ventilation line 11a that is routed from the left-hand side 12c of the tank system 5 to the right-hand side 12d of the tank system 5. More specifically, the crossing ventilation line 11a is routed from the ventilation point 14a of the ventilation points 14 to the expansion tank 17, which is exemplarily arranged at or close to the right-hand side 12d of the tank system 5. The ventilation point 14a is preferably located at or close to the left-hand side 12c and, preferentially, at or close to the forward side 12a.

The at least one other ventilation line 11b of the ventilation lines 11 is routed along the right-hand side 12d of the tank system 5 to the expansion tank 17. More specifically, the ventilation line 11b is routed from the ventilation point 14b of the ventilation points 14, which is provided at the main tank 5a, to the expansion tank 17. The ventilation point 14b is preferably located at or close to the right-hand side 12d and, preferentially, at or close to the forward side 12a.

Moreover, the at least one other ventilation line 11c of the ventilation lines 11 may be routed along the right-hand side 12d of the tank system 5 to the expansion tank 17. The ventilation line 11c may be routed from the ventilation point 14c of the ventilation points 14, which is provided at the supply tank 5b, to the expansion tank 17. The ventilation point 14c is preferably located at or close to the right-hand side 12d and, preferentially, at or close to the rearward side 12b.

Preferably, the at least one and, illustratively, two more crossing ventilation lines 11d, 11e are routed from the right-hand side 12d of the tank system 5 to the left-hand side 12c of the tank system 5. According to one aspect, the crossing ventilation lines 11d, 11e connect associated ventilation points 14d, 14e of the ventilation points 14 provided at the expansion tank 17 to the ventilation line outlets 13.

Furthermore, the gravity fuel port tank connection 6 with the gravity fuel port 6b is shown. However, in contrast to FIG. 3, the gravity fuel port tank connection 6 now connects the gravity fuel port 6b to the left-hand side 12c of the main tank 5a. More specifically, the gravity fuel port tank connection 6 preferably comprises a suitable one-way valve, which may e.g. be located at least approximately in the middle of the left-hand side 12c of the tank system 5, as illustrated.

Figure 9:
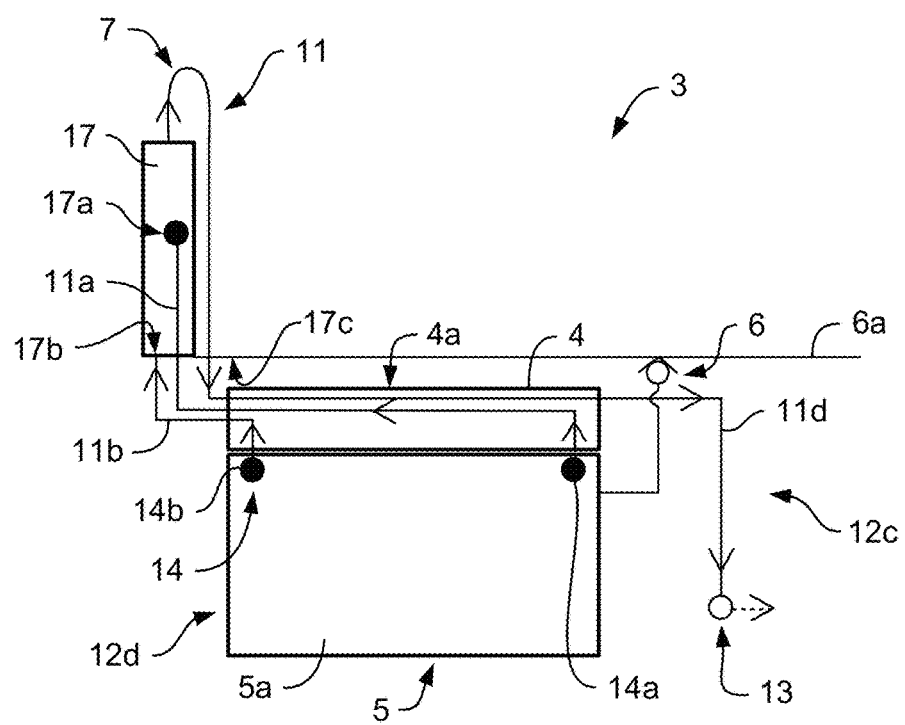
FIG. 9 shows a schematic front view of the fuel storage system of FIG. 6 to FIG. 8.

FIG. 9 shows the fuel storage system 3 with the tank system 5 and the ventilation system 7 of FIG. 6 to FIG. 8, as well as the floor panel 4 that defines the floor panel level 4a of FIG. 6 and FIG. 7, and is described in more detail in the light of FIG. 4. The tank system 5 includes the main tank 5a and the expansion tank 17, and the ventilation system 7 is preferentially embodied as a cross ventilation system with the plurality of ventilation lines 11 and the ventilation line outlets 13.

FIG. 9 further illustrates routing of the at least one crossing ventilation line 11a of FIG. 8 underneath or in the floor panel 4 from the left-hand side 12c of the tank system 5 to the right-hand side 12d of the tank system 5, as well as routing of the crossing ventilation lines 11d, 11e of FIG. 8 underneath or in the floor panel 4 from the right-hand side 12d of the tank system 5 to the left-hand side 12c of the tank system 5.

Moreover, routing of the crossing ventilation line 11a and the ventilation line 11b of FIG. 8 to associated connection positions 17a, 17b at the expansion tank 17 is illustrated. Preferably, the connection position 17a is above the connection position 17b, i.e. the connection position 17a is further away from the floor panel 4 than the connection position 17b, such that both ventilation sides will always be ventilated, independent of any roll angle deviation due to terrain irregularities.

Furthermore, in contrast to FIG. 4 the gravity fuel port 6b of the gravity fuel port tank connection 6 is now at least arranged such that the maximum gravity fueling level 6a is maximally located at a lower expansion tank level 17c defined by a lower side of the expansion tank 17, as illustrated. Preferably, the gravity fuel port tank connection 6 is arranged above the floor panel level 4a and below the lower expansion tank level 17c. Thus, filling of the expansion tank 17 during gravity fueling of the main tank 5a may be prevented, while completely filling the main tank 5a is rendered possible.

Figure 10:
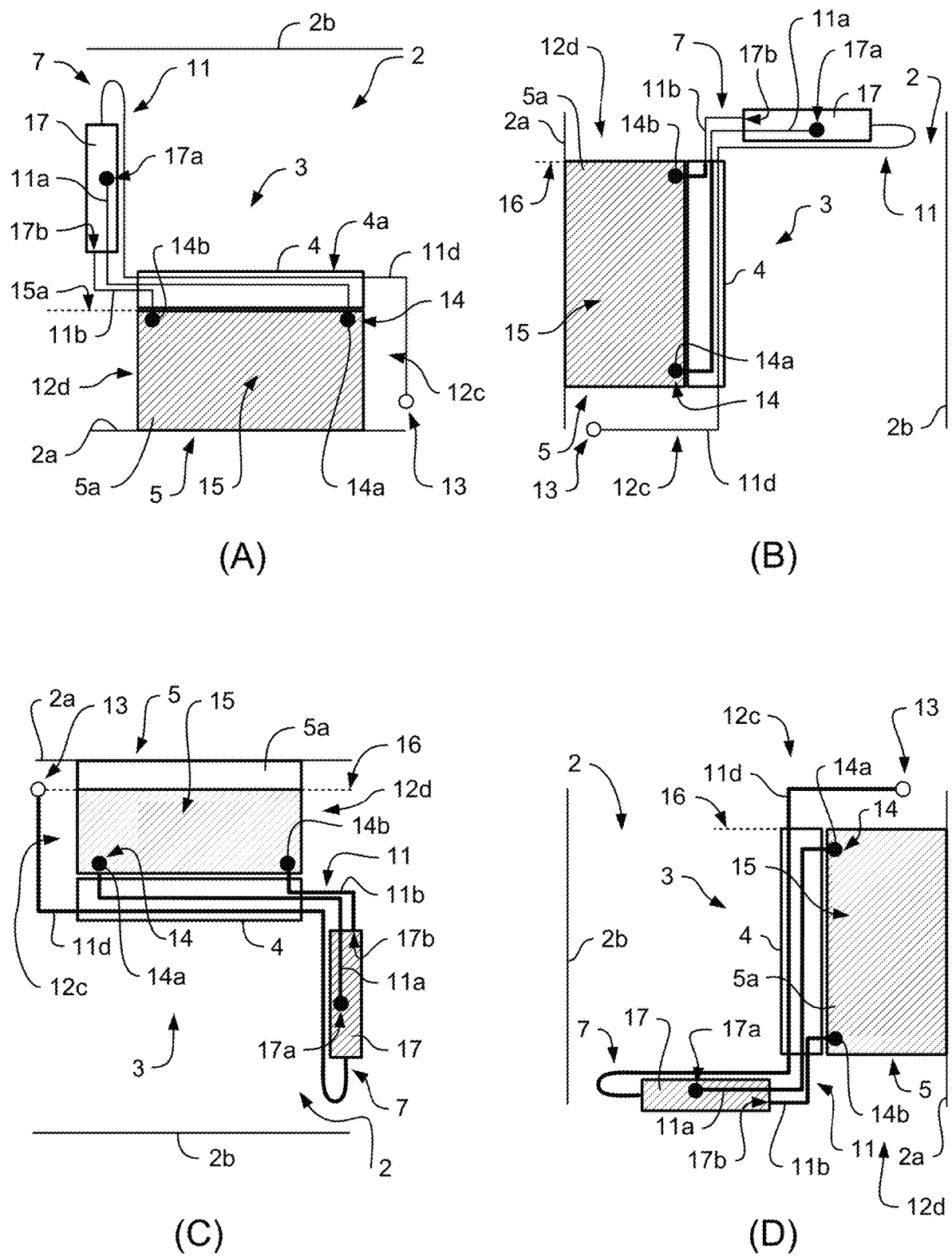
FIG. 10 shows the schematic front view of the fuel storage system of FIG. 9 in different positions during rollover.

FIG. 10 shows the fuel storage system 3 with the tank system 5 and the ventilation system 7 of FIG. 9, as well as the floor panel 4 of FIG. 6 that defines the floor panel level 4a. The tank system 5 includes the main tank 5a as well as the expansion tank 17, and the ventilation system 7 is preferentially embodied as a cross ventilation system with the plurality of ventilation lines 11 and the ventilation line outlets 13. Furthermore, the bottom shell 2a and the upper shell 2b of the fuselage 2 of the helicopter 1 of FIG. 6 are shown to enable illustration of a spatial arrangement of the fuel storage system 3 relative to the fuselage 2 in four different, exemplified positions of the helicopter 1 during rollover. The four different positions are labelled from (A) to (D), and are described in more detail in the light of FIG. 5.

Position (A) corresponds to the normal head up position of the fuselage 2 with the upper shell 2b on top and the bottom shell 2a below. In this normal head up position, the fuel 15 is in the main tank 5a and no fuel is in the ventilation system 7 or the expansion tank 17. More specifically, the fuel 15 illustratively fills the main tank 5a up to the fuel level 15a, which corresponds by way of example to a maximally possible filling of the main tank 5a. However, the ventilation lines 11 and the expansion tank 17 are free of fuel and, consequently, the ventilation line outlets 13 are free of fuel, such that a fuel leakage may be prevented.

Position (B) corresponds to the first tilted position of the fuselage 2, wherein the fuselage 2 is exemplarily tilted by 90° from its normal head up position according to position (A) to the left side. Accordingly, the tank system 5 is illustratively lying on the left-hand side 12c.

In this first tilted position, the fuel 15 flows from the main tank 5a into the ventilation system 7 until an equilibrium is established between the main tank 5a and the ventilation system 7 according to the communicating vessels principle, as illustrated. In this equilibrium, the expansion tank 17 is free of fuel, as a highest point of the main tank 5a is lower than the expansion tank 17. Thus, the ventilation line outlets 13 likewise remain free of fuel, such that a fuel leakage may be prevented.

Position (C) corresponds to an upside-down position of the fuselage 2, with the bottom shell 2a on top and the upper shell 2b below. Accordingly, the tank system 5 is reversed and illustratively lying on its top side.

In this upside-down position, the fuel 15 flows from the main tank 5a into the ventilation system 7 and the expansion tank 17 until an equilibrium is established between the main tank 5a, the expansion tank 17, and the ventilation system 7 according to the communicating vessels principle. As illustrated, the equilibrium is reached when the expansion tank 17 is completely filled with fuel and when the ventilation system 7 is filled with fuel until the high of the ventilation line outlets 13. However, the ventilation line outlets 13 remain preferably free of fuel as the maximum fuel level 16 in the reversed main tank 5a is preferably lower, or maximally at an equal height, than the ventilation line outlets 13 due to the dimensioning of the expansion tank 17, such that a fuel leakage may be prevented.

Position (D) corresponds to a second tilted position of the fuselage 2, wherein the fuselage 2 is exemplarily tilted by 90° from its normal head up position according to position (A) to the right side. Accordingly, the tank system 5 is illustratively lying on the right-hand side 12d.

In this second tilted position, the fuel 15 also flows from the main tank 5a into the ventilation system 7 and the expansion tank 17 until an equilibrium is established between the main tank 5a, the expansion tank 17 and the ventilation system 7 according to the communicating vessels principle, as illustrated. In this equilibrium, the ventilation line outlets 13 remain free of fuel, as a highest point of the main tank 5a is lower than the ventilation line outlets 13, such that a fuel leakage may be prevented.

Figure 11:
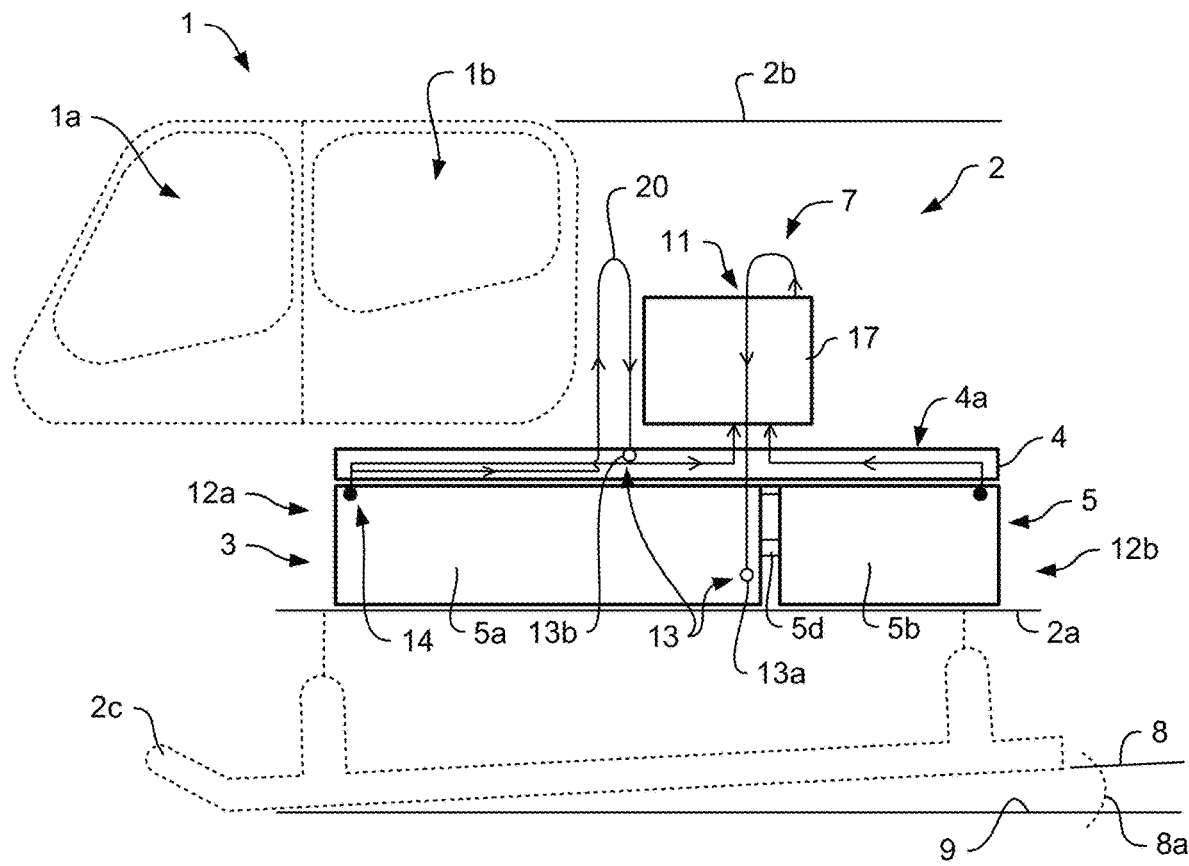
FIG. 11 shows a schematic view of an aircraft having a fuel storage system according to a third embodiment.

FIG. 11 shows the helicopter 1 of FIG. 6 with the fuselage 2 having the bottom shell 2a as well as the upper shell 2b, the floor panel 4 that forms the floor panel level 4a, and the fuel storage system 3 with the tank system 5 and the ventilation system 7. The tank system 5 includes the at least one main tank 5a, the supply tank 5b, as well as the expansion tank 17, and the ventilation system 7 is preferentially embodied as a cross ventilation system with the plurality of ventilation lines 11 and the ventilation line outlets 13.

However, in contrast to FIG. 6 at least one of the plurality of ventilation lines 11 is now according to a further alternative realization preferably extended by means of an extra ventilation hose line 20 which is not connected to the expansion tank 17. More specifically, instead of connecting the expansion tank 17 according to FIG. 6 via the two ventilation lines (11d, 11e in FIG. 8) to the ventilation line outlets 13, now preferably only a single ventilation line (11e in FIG. 13) of the plurality of ventilation lines 11 is connected to a ventilation line outlet 13a of the ventilation line outlets 13, while the extra ventilation hose line 20 is preferably directly connected to a ventilation line outlet 13b of the ventilation line outlets 13.

According to one aspect, the extra ventilation hose line 20 functions as an expansion tank. Thus, the overall dimensions of the expansion tank 17 as such may advantageously be reduced and a respective fuel expansion volume may be divided among the expansion tank 17 and the extra ventilation hose line 20. Moreover, in an alternative realization the extra ventilation hose line 20 may be replaced by an additional expansion tank.

Figure 12:
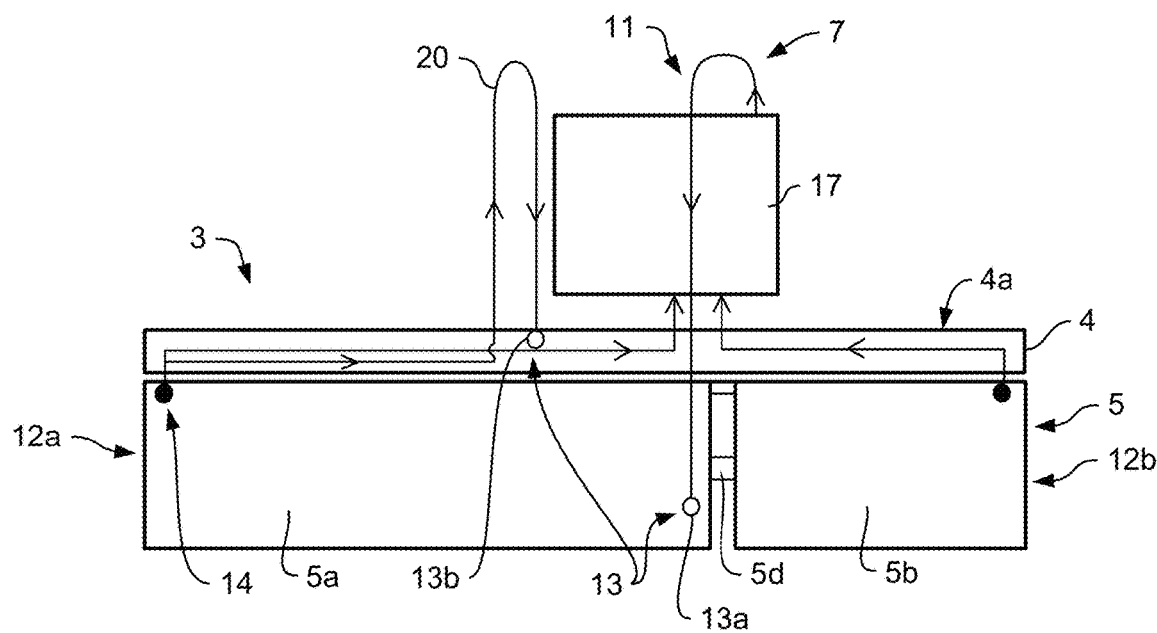
FIG. 12 shows a schematic side view of the fuel storage system of FIG. 11.

FIG. 12 shows the fuel storage system 3 and the floor panel 4 of FIG. 11, and is described in more detail in the light of FIG. 7. The fuel storage system 3 includes at least the tank system 5 and the ventilation system 7 of FIG. 6. The tank system 5 includes the at least one main tank 5*a*, the supply tank 5*b*, as well as the expansion tank 17, and the ventilation system 7 is preferentially embodied as a cross ventilation system with the plurality of ventilation lines 11, which includes the extra ventilation hose line 20, and the ventilation line outlets 13. The at least one main tank 5*a* and, more generally, the tank system 5 is arranged underneath the floor panel 4.

Preferably, the ventilation lines 11, at the exception of the extra ventilation hose line 20, are at least essentially arranged and/or routed underneath or in the floor panel 4, i.e. underneath the floor panel level 4*a*. The extra ventilation hose line 20 may have a highest point which is above a highest point of the expansion tank 17.

The floor panel 4 is preferably formed in sandwich construction. Thus, the floor panel 4 may be embodied to enable routing of the ventilation lines 11 in the floor panel 4.

Figure 13:
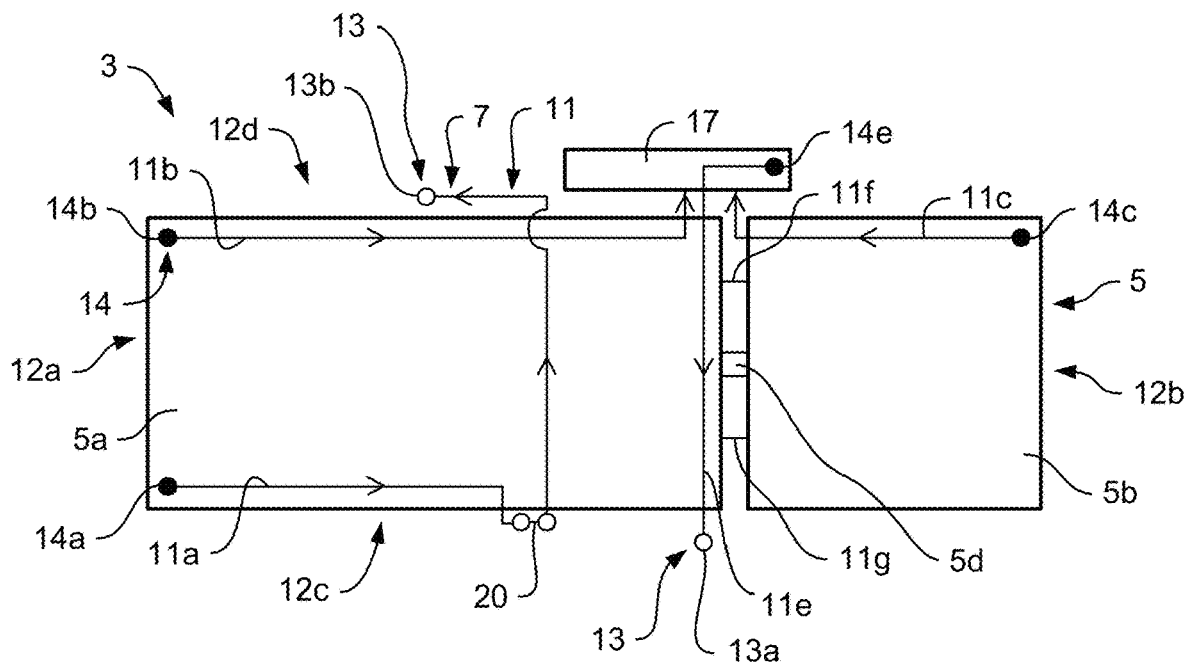
FIG. 13 shows a schematic top view of the fuel storage system of FIG. 11 and FIG. 12.

FIG. 13 shows the fuel storage system 3 with the tank system 5 and the ventilation system 7 of FIG. 11 and FIG. 12, and is described in more detail in the light of FIG. 8. The tank system 5 includes the at least one main tank 5*a*, the supply tank 5*b*, as well as the expansion tank 17, and the ventilation system 7 is preferentially embodied as a cross ventilation system with the plurality of ventilation lines 11, which include the extra ventilation hose line 20, and the ventilation line outlets 13.

The plurality of ventilation lines 11 comprises the at least one crossing ventilation line 11*a* that is routed from the left-hand side 12*c* of the tank system 5 to the right-hand side 12*d* of the tank system 5. More specifically, the crossing ventilation line 11*a* is routed from the ventilation point 14*a* of the ventilation points 14 to the ventilation line outlet 13*b* of the ventilation line outlets 13, which is exemplarily arranged at or close to the right-hand side 12*d* of the tank system 5. The ventilation point 14*a* is preferably located at or close to the left-hand side 12*c* and, preferentially, at or close to the forward side 12*a*.

However, in contrast to FIG. 8, the crossing ventilation line 11*a* is now preferably extended via the extra ventilation hose line 20. By way of example, the extra ventilation hose line 20 is located at the left-hand side 12*c* of the tank system 5.

The at least one other ventilation line 11*b* of the ventilation lines 11 is routed along the right-hand side 12*d* of the tank system 5 to the expansion tank 17. More specifically, the ventilation line 11*b* is routed from the ventilation point 14*b* of the ventilation points 14, which is provided at the main tank 5*a*, to the expansion tank 17. The ventilation point 14*b* is preferably located at or close to the right-hand side 12*d* and, preferentially, at or close to the forward side 12*a*.

Moreover, the at least one other ventilation line 11*c* of the ventilation lines 11 may be routed along the right-hand side 12*d* of the tank system 5 to the expansion tank 17. The ventilation line 11*c* may be routed from the ventilation point 14*c* of the ventilation points 14, which is provided at the supply tank 5*b*, to the expansion tank 17. The ventilation point 14*c* is preferably located at or close to the right-hand side 12*d* and, preferentially, at or close to the rearward side 12*b*.

Preferably, the at least one more crossing ventilation line 11*e* is routed from the right-hand side 12*d* of the tank system 5 to the left-hand side 12*c* of the tank system 5. According to one aspect, the crossing ventilation line 11*e* connects the associated ventilation point 14*e* of the ventilation points 14 provided at the expansion tank 17 to the ventilation line outlet 13*a* of the ventilation line outlets 13.

It should be noted that in contrast to FIG. 8 provision of the crossing ventilation line 11*d* is omitted, as the crossing ventilation line 11*a* is directly connected to the ventilation line outlet 13*b*. Furthermore, it should be noted that in contrast to FIG. 8 illustration of the gravity fuel port tank connection 6 is omitted, for simplicity and clarity of the drawing.

Figure 14:
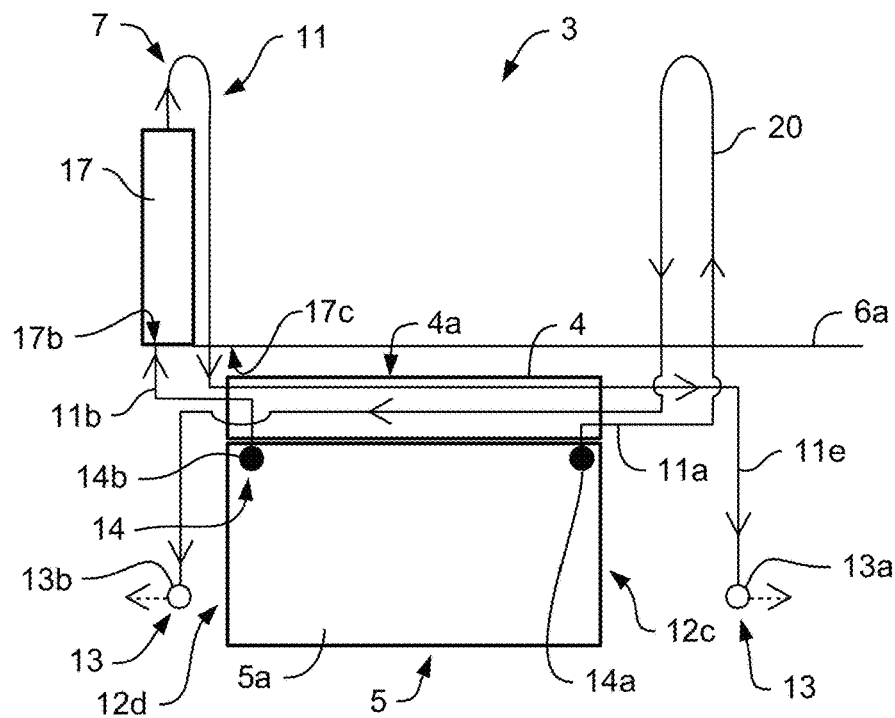
FIG. 14 shows a schematic front view of the fuel storage system of FIG. 11 to FIG. 13.

FIG. 14 shows the fuel storage system 3 with the tank system 5 and the ventilation system 7 of FIG. 11 to FIG. 13, as well as the floor panel 4 that defines the floor panel level 4*a* of FIG. 11 and FIG. 12, and is described in more detail in the light of FIG. 9. The tank system 5 includes the main tank 5*a* and the expansion tank 17, and the ventilation system 7 is preferentially embodied as a cross ventilation system with the plurality of ventilation lines 11, which includes the extra ventilation hose line 20, and the ventilation line outlets 13.

FIG. 14 further illustrates routing of the at least one crossing ventilation line 11*a* of FIG. 13 underneath or in the floor panel 4 from the left-hand side 12*c* of the tank system 5 to the right-hand side 12*d* of the tank system 5, as well as routing of the crossing ventilation line 11*e* of FIG. 13 underneath or in the floor panel 4 from the right-hand side 12*d* of the tank system 5 to the left-hand side 12*c* of the tank system 5.

Moreover, routing of the crossing ventilation line 11*a* of FIG. 13 via the extra ventilation hose line 20 to the ventilation line outlet 13*b*, as well as routing of the ventilation line 11*b* of FIG. 13 to the connection position 17*b* at the expansion tank 17 is illustrated. Likewise, arrangement of the expansion tank 17 on the right-hand side 12*d* of the tank system 5 and arrangement of the extra ventilation hose line 20 on the opposite left-hand side 12*c* are further illustrated.

Figure 15:
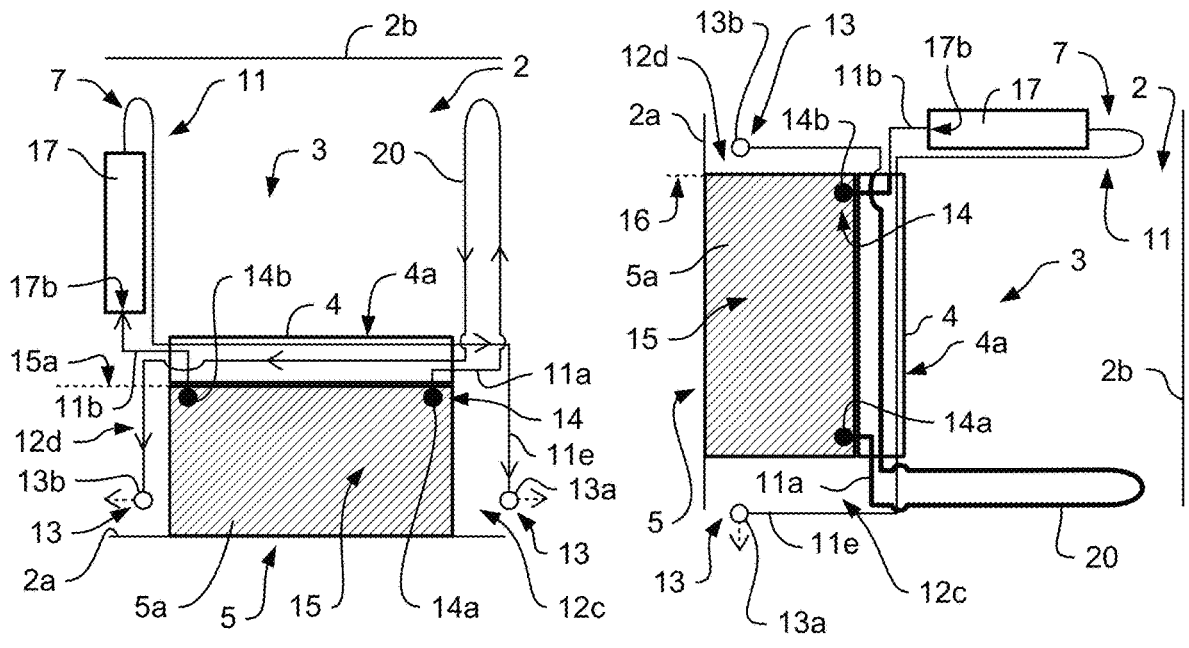
FIG. 15 shows the schematic front view of the fuel storage system of FIG. 14 in different positions during rollover.
Figure 15:
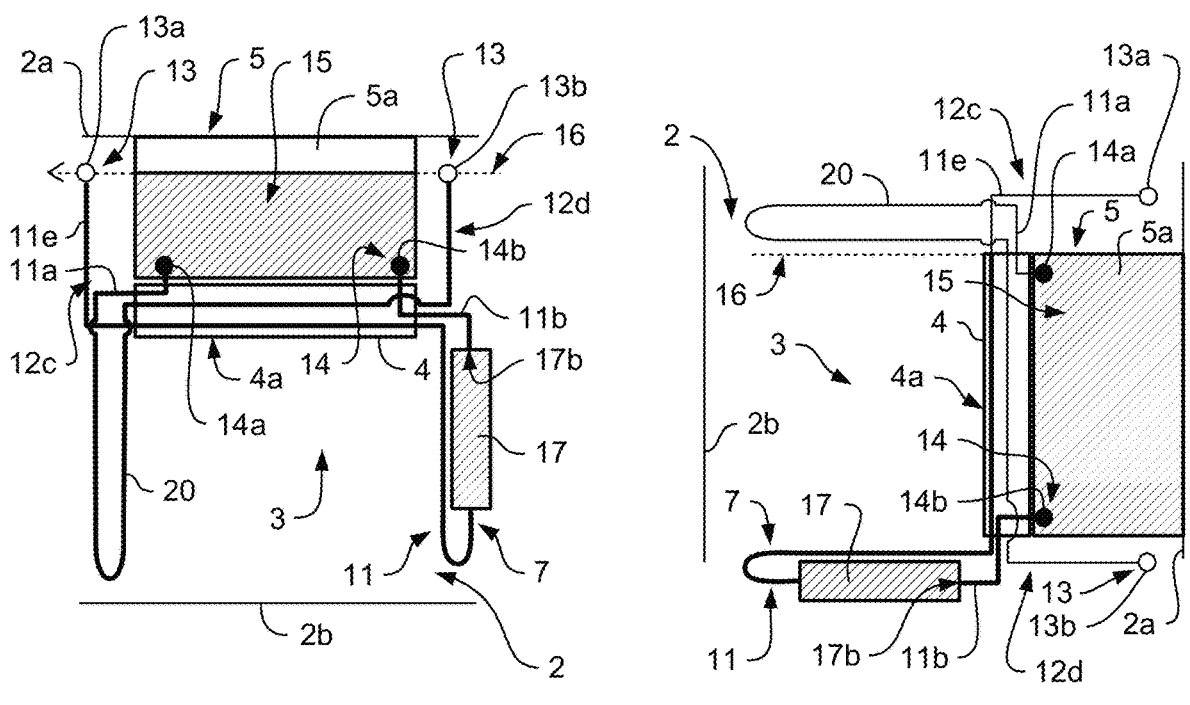

FIG. 15 shows the fuel storage system 3 with the tank system 5 and the ventilation system 7 of FIG. 14, as well as the floor panel 4 of FIG. 11 that defines the floor panel level 4*a*. The tank system 5 includes the main tank 5*a* as well as the expansion tank 17, and the ventilation system 7 is preferentially embodied as a cross ventilation system with the plurality of ventilation lines 11, which includes the extra ventilation hose line 20, and the ventilation line outlets 13 including the separate ventilation line outlets 13*a*, 13*b*. Furthermore, the bottom shell 2*a* and the upper shell 2*b* of the fuselage 2 of the helicopter 1 of FIG. 11 are shown to enable illustration of a spatial arrangement of the fuel storage system 3 relative to the fuselage 2 in four different, exemplified positions of the helicopter 1 during rollover. The four different positions are labelled from (A) to (D), and are described in more detail in the light of FIG. 10.

Position (A) corresponds to the normal head up position of the fuselage 2 with the upper shell 2*b* on top and the bottom shell 2*a* below. In this normal head up position, the fuel 15 is in the main tank 5*a* and no fuel is in the ventilation system 7. More specifically, the fuel 15 illustratively fills the main tank 5*a* up to the fuel level 15*a*, which corresponds by way of example to a maximally possible filling of the main tank 5*a*. However, the ventilation lines 11 with the extra ventilation hose line 20 and the expansion tank 17 are free of fuel and, consequently, the ventilation line outlets 13 are free of fuel, such that a fuel leakage may be prevented.

Position (B) corresponds to the first tilted position of the fuselage 2, wherein the fuselage 2 is exemplarily tilted by 90° from its normal head up position according to position (A) to the left side. Accordingly, the tank system 5 is illustratively lying on the left-hand side 12c.

In this first tilted position, the fuel 15 flows from the main tank 5a into the ventilation system 7 until an equilibrium is established between the main tank 5a and the ventilation system 7 according to the communicating vessels principle, as illustrated. In this equilibrium, the extra ventilation hose line 20 is filled with fuel, but the associated ventilation line outlet 13b is free of fuel, as a highest point of the main tank 5a is lower than the ventilation line outlet 13b. Similarly, the expansion tank 17 is free of fuel, as a highest point of the main tank 5a is lower than the expansion tank 17, such that the associated ventilation line outlet 13a is also free of fuel. Thus, both ventilation line outlets 13a, 13b remain free of fuel, such that a fuel leakage may be prevented.

Position (C) corresponds to an upside-down position of the fuselage 2, with the bottom shell 2a on top and the upper shell 2b below. Accordingly, the tank system 5 is reversed and illustratively lying on its top side.

In this upside-down position, the fuel 15 flows from the main tank 5a into the ventilation system 7 and the expansion tank 17 until an equilibrium is established between the main tank 5a, the expansion tank 17, and the ventilation system 7 according to the communicating vessels principle. As illustrated, the equilibrium is reached when the expansion tank 17 is completely filled with fuel and when the ventilation system 7 including the extra ventilation hose line 20 is filled with fuel until the high of the ventilation line outlets 13a, 13b. However, the ventilation line outlets 13a, 13b remain preferably free of fuel as the maximum fuel level 16 in the reversed main tank 5a is preferably lower, or maximally at an equal height, than the ventilation line outlets 13a, 13b due to the dimensioning of the expansion tank 17 and the extra ventilation hose line 20, such that a fuel leakage may be prevented.

Position (D) corresponds to a second tilted position of the fuselage 2, wherein the fuselage 2 is exemplarily tilted by 90° from its normal head up position according to position (A) to the right side. Accordingly, the tank system 5 is illustratively lying on the right-hand side 12d.

In this second tilted position, the fuel 15 flows from the main tank 5a into the ventilation system 7 and the expansion tank 17 until an equilibrium is established between the main tank 5a, the expansion tank 17 and the ventilation system 7 according to the communicating vessels principle, as illustrated. In this equilibrium, the expansion tank 17 is filled with fuel, but the associated ventilation line outlet 13a is free of fuel, as a highest point of the main tank 5a is lower than the ventilation line outlet 13a. Similarly, the extra ventilation hose line 20 is free of fuel, as a highest point of the main tank 5a is lower than the extra ventilation hose line 20, such that the associated ventilation line outlet 13b is also free of fuel. Thus, both ventilation line outlets 13a, 13b remain free of fuel, such that a fuel leakage may be prevented.

It should be noted that modifications to the above described embodiments are within the common knowledge of the person skilled in the art and, thus, also considered as being part of the present invention. It should further be noted that the drawings are only intended for schematically representing embodiments of the present invention and not for showing detailed constructions thereof.

REFERENCE LIST 1 aircraft
1a cockpit
1b cabin
2 fuselage
2a bottom shell
2b upper shell
2c landing gear
3 fuel storage system
4 floor panel
4a floor panel level
5 tank system
5a main tank
5b supply tank
5c fuel volume expansion space
5d tank connection
gravity fuel port tank connection
6a maximum gravity fueling level
6b gravity fuel port
7 ventilation system
8 ground
8a angle
9 flat reference plane
10 manifold connection
11 ventilation lines
11a-11g separate ventilation lines
12a forward side
12b rearward side
12c left-hand side
12d right-hand side
13 ventilation line outlets
13a ventilation line outlet on right-hand side
13b ventilation line outlet on left-hand side
14 ventilation points
14a-14e separate ventilation points
15 fuel
15a fuel level
16 maximum fuel level
17 expansion tank
17a first connection position
17b second connection position
17c lower expansion tank level
18 fuel volume expansion space height
19 ventilation line outlet spacing
20 extra ventilation hose line

What is claimed is:

1. An aircraft with a fuselage that accommodates a floor panel and a fuel storage system, wherein the fuel storage system comprises:
   a tank system with at least one main tank that is arranged underneath the floor panel in the fuselage;
   a cross ventilation system with a plurality of ventilation lines for venting the tank system, wherein the plurality of ventilation lines comprises at least one crossing ventilation line that is routed from a first lateral side of the tank system to an opposite second lateral side of the tank system;
   wherein the at least one crossing ventilation line is routed underneath or in the floor panel from the first lateral side of the tank system to the second lateral side of the tank system; and wherein the floor panel defines a floor panel level; and
   a manifold connection that is connected to the plurality of ventilation lines, wherein the manifold connection is arranged above the floor panel level of the floor panel, wherein the at least one crossing ventilation line is routed underneath or in the floor panel from a first ventilation point provided at the first lateral side on the at least one main tank to the manifold connection that is arranged at the second lateral side.

2. The aircraft of claim 1 wherein the tank system comprises a gravity fuel port tank connection for enabling gravity fueling of the at least one main tank, wherein the gravity fuel port tank connection is arranged in a manner such as to prevent an entire filling of the at least one main tank by means of gravity fueling.

3. The aircraft of claim 2 wherein the gravity fuel port tank connection is provided with a one-way valve.

4. The aircraft of claim 1 wherein the plurality of ventilation lines comprises at least one further ventilation line that is routed underneath or in the floor panel from a second ventilation point provided at the second lateral side on the at least one main tank to the manifold connection.

5. The aircraft of claim 1 wherein the plurality of ventilation lines comprises at least two outlet ventilation lines that are routed underneath or in the floor panel from the manifold connection arranged at the second lateral side to associated outlets arranged at the first lateral side.

6. The aircraft of claim 1 wherein the at least one main tank of the tank system comprises a predetermined fuel volume expansion space.

7. The aircraft of claim 1 wherein the aircraft is a helicopter.

8. A fuel storage system for an aircraft with a fuselage having a floor panel, wherein the fuel storage system comprises:
 a fuel tank system having at least one fuel tank arranged underneath the floor panel in the fuselage;
 a cross ventilation system comprising:
  a manifold connection arranged above the floor panel; and
  a plurality of ventilation lines interconnected at the manifold connection for venting the at least one fuel tank and having at least one crossing ventilation line that is routed from a first lateral side of the tank system to an opposite second lateral side of the tank system,
 wherein the at least one crossing ventilation line is routed underneath or in the floor panel from the first lateral side of the tank system to the second lateral side of the tank system, and
 wherein the at least one crossing ventilation line is routed underneath or in the floor panel from a first ventilation point provided at the first lateral side on the at least one fuel tank to the manifold connection that is arranged at the second lateral side.

9. The fuel storage system of claim 8, wherein the at least one fuel tank comprises a main tank and a gravity fuel port tank connection for enabling gravity fueling of the main tank, wherein the gravity fuel port tank connection is arranged to prevent entirely filling of the main tank by gravity fueling.

10. The fuel storage system of claim 9, wherein the gravity fuel port tank connection is provided with a one-way valve.

11. The fuel storage system of claim 8, wherein the plurality of ventilation lines comprises at least one further ventilation line that is routed underneath or in the floor panel from a second ventilation point provided at the second lateral side on the at least one fuel tank to the manifold connection.

12. The fuel storage system of claim 8, wherein the plurality of ventilation lines comprises at least two outlet ventilation lines that are routed underneath or in the floor panel from the manifold connection arranged at the second lateral side to associated outlets arranged at the first lateral side.

* * * * *